HERMETICALLY SEALED CASING FOR ELECTRICAL COMPONENTS

Filed March 3, 1964

INVENTOR
HANS WAGNER
BY Philip M. Bolton
ATTORNEY

United States Patent Office 3,305,624
Patented Feb. 21, 1967

3,305,624

HERMETICALLY SEALED CASING FOR ELECTRICAL COMPONENTS

Hans Wagner, Nurnberg, Germany, assignor to International Standard Electric Corporation, New York, N.Y., a corporation of Delaware Filed Mar. 3, 1964, Ser. No. 349,026
Claims priority, application Germany, Mar. 13, 1963, St 15,744
9 Claims. (Cl. 174—52)

This invention relates to an improved casing for electrical components such as rectifiers wherein the various sections have different thermal expansion characteristics.

In general, electrical components must be tightly encased in order to protect them against the influence of the surrounding atmosphere. Considerable heat occurs in many elements or components during operation, which heat must be conducted through the casing. This, in turn, causes the casing to be heated, which results in difficulties when the individual portions of the casing are formed of materials with different thermal expansion properties. Due to the different expansion of the individual parts during heating, frequently followed by a cooling period during the intermittent operation of the component, the connection between the sections of the casing is sometimes loosened so that air can penetrate into the interior of the casing and cause damage to the component within a short time.

It was found that this deficiency was in most cases due to the fact that the individual parts of the casing are rigidly connected over a large surface so that during heating, movement between parts causes loosening. If, for example, parts of the casing are connected by solder, the solder layer becomes brittle after several heatings and cracks are formed which cause leakage through the tight enclosure.

In order to avoid these difficulties, the invention proposes to limit the rigid connection between the individual parts of the casing to the direct vicinity of the openings to be enclosed. In the immediate area of the seal, very little movement takes place, whereas the other casing parts can move more freely without affecting the tightness of the sealed case. It does not matter, whether the seal was made by glueing, soldering, or any other suitable method.

The invention is of importance particularly in casings which are formed of plastic material having openings covered with metal parts. Such casings are used frequently for electrical semiconductor devices, such as rectifiers and transistors, with the metallic parts dissipating the heat occurring during the operation. In order to conduct the heat properly, the metallic parts are made larger than the openings to be closed thereby. The larger metallic parts have a higher heat capacity, which is of particular importance during short-time excessive loads, and, also provide a larger surface to transfer the heat to the ambient atmosphere or to a suitable cooling device. The center portions of the casings are preferably of ceramic and are connected with the metallic parts by a metallized surface wherein the metal parts are soldered to this metallized area.

For example, ceramic cylinders, provided with drill holes, were proposed which are metallized at the end surfaces and enclosed by soldered-on metal plates. A rectifier element can be mounted in the hole of such a ceramic cylinder so that one semiconductor electrode is secured to one metal plate which encloses an end of the ceramic cylinder. Such a configuration was described in copending application No. 295,331, filed July 16, 1963, and assigned to the same assignee as the instant application. It is considered suitable to make this metal plate particularly thick, because the greatest heat concentration will be encountered at this spot.

Such a casing for rectifiers can have an additional drill hole, preferably in the center, which also goes through the terminating metal plates so that the entire casing can be mounted on a bolt.

The figures of the accompanying drawing show examples of the invention wherein.

Figure 1:
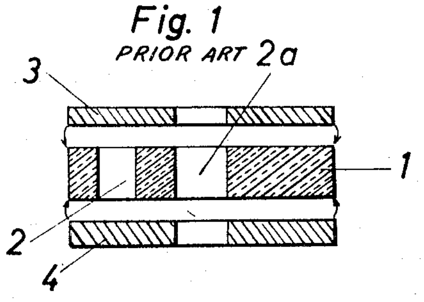
Fig. 1 PRIOR ART
FIGURE 1 shows a cross-section of the prior art arrangement.
Figure 2:
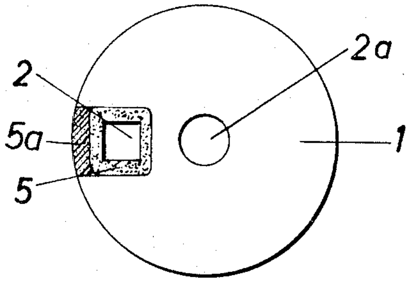
FIGURE 2 is a top view showing the present invention.

FIGURE 1 shows a cylindrical ceramic or suitable plastic casing 1 in section, provided with two holes 2 and *2a*. The boring or drill hole 2 serves to accommodate an electrical component, such as a rectifier element. The hole *2a* preferably serves to mount the casing on a base or on a cooling device. The hole 2 is closed by metal plates of proper heat-conducting material such as copper or silver, the metal plates being soldered to the metallized front sides or faces of the ceramic cylinder 1. As may be gathered from FIGURE 1, the metal disks 3 and 4 have the same diameter as the ceramic cylinder 1, in order to provide proper heat conduction and to have a large contact surface. The faces of the ceramic cylinder 1 are metallized only in the immediate vicinity of the hole 2, according to the invention, as represented at surface 5 in FIGURE 2, which figure shows a top view of the ceramic disk 1. The metallized area 5 may also be extended to the edge of the ceramic disk as indicated by the further shaded area *5a*, which is of advantage in the soldering process.

Figure 3:
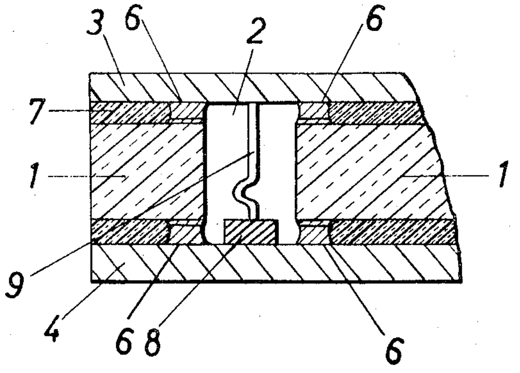
FIGURE 3 shows a partial sectional view of the details of the novel arrangement.

FIGURE 3 shows in detail a section through the assembled casing in the vicinity of hole 2. At the points 6, the metal disks 3 and 4 are rigidly connected with the metallized surface of ceramic disk 1 by solder. The remaining space between the parts of the casing can be filled, as indicated at 7, by an elastic medium, for example a suitable plastic material. The semiconductor elements 8 is arranged in the hole in such a way that one electrode is secured on the metal plate 4. The second lead 9 is conductively connected with the metal plate 3. Since the heat is generated in the semiconductor element 8, it is preferable to make the metal disk 4 thicker than the disk 3.

The invention, however, is not limited to the specific example described above and shown on the drawing, but can be used in general for casings for various electrical components with different temperature expansion properties.

What is claimed is:

1. An electrical component casing, comprising:

an electrical component;

a base member having a cavity therein containing said component, a given surface of said member having an aperture therein communicating with said cavity;

a conductive layer disposed adjacent said surface and covering said aperture, said layer having an area substantially greater than the area of said aperture, said layer having thermal expansion characteristics different from those of said base member; and a bonding layer of rigid material forming a seal between said base member and said conductive layer only in a bonding region closely surrounding said aperture, said conductive layer having an area substantially greater than the area of said bonding region.

2. A casing according to claim 1, furher comprising a filling layer of flexible material disposed between said base member and said conductive layer and surrounding said bonding layer.

3. A casing according to claim 1 wherein said bonding layer extends from said aperture to an adjacent edge of said base member.

4. A casing according to claim 1, wherein said conductive layer is substantially coextensive with said given surface.

5. A casing according to claim 1, wherein said given surface is substantially planar and said base member comprises a cylindrical body having a major surface substantially parallel to said given surface.

6. A casing according to claim 5, wherein said component comprises a semiconductor device having at least two terminals and said cavity comprises a hole extending between said parallel surfaces, further comprising an additional conductive layer disposed on said major surface and covering said hole, each of said terminals being electrically connected to a respective one of said conductive layers.

7. A casing according to claim 6, further comprising an additional bonding layer of rigid material forming a seal between said base member and said additional conductive layer only in the region closely surrounding said hole.

8. A casing according to claim 7, further comprising a hole through said conductive layers and said base member for mounting said casing.

9. An electrical component casing comprising a conductive base having an electrical component mounted thereon, an insulating body secured to said base and having a hole therein to accommodate said component, one end of said hole communicating with said base, a conductive plate adjacent said insulating body and covering the other end of said hole, said insulating body having thermal expansion characteristics different from said base and said plate, and a layer of rigid material extending from said hole to an adjacent edge of said body and forming a seal between said plate and said body only in the space closely surrounding said hole.

References Cited by the Examiner

UNITED STATES PATENTS 2,878,399 3/1959 Lair.
2,956,214 10/1960 Herbst.
2,971,138 2/1961 Meisel ............. 317—234

LEWIS H. MYERS, *Primary Examiner.*

H. W. COLLINS, *Assistant Examiner.*